(12) United States Patent
Kim et al.

(10) Patent No.: US 10,713,562 B2
(45) Date of Patent: Jul. 14, 2020

(54) NEUROMORPHIC MEMORY CIRCUIT

(71) Applicant: International Business Machines Corporation, Armonk, NY (US)

(72) Inventors: SangBum Kim, Yorktown Heights, NY (US); Chung H. Lam, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 15/186,448

(22) Filed: Jun. 18, 2016

(65) Prior Publication Data

US 2017/0364801 A1   Dec. 21, 2017

(51) Int. Cl.
| | | |
|---|---|---|
| *G06N 3/063* | (2006.01) | |
| *G06N 3/04* | (2006.01) | |
| *G06N 3/08* | (2006.01) | |

(52) U.S. Cl.
CPC ........... *G06N 3/0635* (2013.01); *G06N 3/049* (2013.01); *G06N 3/04* (2013.01); *G06N 3/084* (2013.01)

(58) Field of Classification Search
CPC ...... G06N 3/0635; G06N 3/049; G06N 3/084; G06N 3/04
USPC .......................................................... 706/27
See application file for complete search history.

(56) References Cited

U.S. PATENT DOCUMENTS

| | | | | |
|---|---|---|---|---|
| 9,189,730 | B1* | 11/2015 | Coenen | ........... G06N 3/049 |
| 10,366,326 | B2 | 7/2019 | Saïghi et al. | |
| 2010/0299297 | A1* | 11/2010 | Breitwisch | ............. G06N 3/049 706/33 |
| 2011/0004579 | A1 | 1/2011 | Snider | |
| 2012/0084240 | A1* | 4/2012 | Esser | ...................... G06N 3/063 706/27 |
| 2012/0317063 | A1* | 12/2012 | Sim | ......................... G06N 3/063 706/27 |
| 2012/0330873 | A1* | 12/2012 | Suri | ........................ H01L 45/04 706/26 |

(Continued)

OTHER PUBLICATIONS

Rasche, C., "Forward- and BackPropagation in a Silicon Dendrite" Mar. 2, 2001 IEEE Transactions on Neural Networks, vol. 12, No. 2, pp. 386-393. (Year: 2001).*

(Continued)

*Primary Examiner* — Miranda M Huang
*Assistant Examiner* — Chase P. Hinckley
(74) *Attorney, Agent, or Firm* — Ido Tuchman; Erik K. Johnson

(57) ABSTRACT

A neuromorphic memory circuit including a programmable resistive memory element, an axon LIF pulse generator to generate an axon LIF pulse, a back propagation pulse generator to generate a back propagation pulse, a postsynaptic capacitor configured to build up a forward propagation LIF charge over time, and a presynaptic capacitor configured to build up a back propagation LIF charge over time. A first transistor activates a first discharge path from the postsynaptic capacitor through the programmable resistive memory element when the axon LIF pulse generator generates the axon LIF pulse. A second transistor activates a second discharge path from the presynaptic capacitor through the programmable resistive memory element when the back propagation pulse generator generates the back propagation pulse.

20 Claims, 13 Drawing Sheets

(56) References Cited

U.S. PATENT DOCUMENTS

| | | | | |
|---|---|---|---|---|
| 2014/0032465 A1* | 1/2014 | Modha | ............... | G06N 3/04 |
| | | | | 706/27 |
| 2014/0172762 A1* | 6/2014 | Suri | ............... | G06N 3/08 |
| | | | | 706/25 |
| 2014/0310220 A1* | 10/2014 | Chang | ............... | G06N 3/063 |
| | | | | 706/25 |
| 2015/0039547 A1* | 2/2015 | Kang | ............... | G06N 3/049 |
| | | | | 706/42 |
| 2015/0106316 A1* | 4/2015 | Birdwell | ............... | G06F 16/22 |
| | | | | 706/33 |
| 2015/0269485 A1* | 9/2015 | Julian | ............... | G06N 3/084 |
| | | | | 706/25 |
| 2016/0019456 A1* | 1/2016 | Annapureddy | ............... | G06N 3/08 |
| | | | | 706/22 |
| 2016/0042271 A1 | 2/2016 | Yoon et al. | | |

OTHER PUBLICATIONS

Yang et al., "Effects of dopings on the electric-field-induced atomic migration and void formation in Ge2Sb2Te5" 2011 Seoul National University 18th IEEE International Symposium on the Physical and Failure Analysis of Integrated Circuits pp. 1-4. (Year : 2011).*

Gao et al., "The Effect of Ti-Rich TiN Film on Thermal Stability of Ge2Sb2Te5 for Phase Change Memory" Feb. 25, 2016 ECS Journal of Solid State Science and Technology (Year: 2016).*

U.S. Appl. No. 14/596,223, filed Jan. 14, 2015, SangBuk Kim et al.

* cited by examiner

NEUROMORPHIC MEMORY CIRCUIT

BACKGROUND

This invention relates generally to memory circuits, and more particularly to a neuromorphic memory circuit for neuromorphic applications.

Neuromorphic computing is motivated by the computational method used by the biological brains (more specifically mammal cerebral cortex) mainly comprised by neurons and synapses. The term "neuron" was coined by Heinrich Wilhelm Gottfried von Waldeyer-Hartz in 1891 to capture the discrete information processing units of the brain. The junctions between two neurons were termed "synapses" by Sir Charles Sherrington in 1897. Information flows only along one direction through a synapse, thus we talk about a "presynaptic" and a "postsynaptic" neuron. Neurons, when activated by sufficient input received via synapses, emit "spikes" that are delivered to those synapses that the neuron is pre-synaptic to.

It is theorized that experiences are captured as conductance of the synapses in the brain. The synaptic conductance changes with time as a function of the relative spike times of presynaptic and post-synaptic neurons. The conductance of a synapse increases if a postsynaptic neuron fires after its pre-synaptic neuron fires, and decreases in conductance if the order of the two firings is reversed. Furthermore, the change depends on the precise delay between the two events, such that the more the delay, the less the magnitude of change.

Computational methods used by the biological brains are quite different from that of today's computer systems which is based on the Von Neumann architecture. Neuromorphic systems, also referred to as artificial neural networks, are computational systems that permit electronic systems to essentially function in a manner analogous to that of biological brains. Neuromorphic systems do not generally utilize a traditional digital model of manipulating 0s and 1s. Instead, neuromorphic systems create connections between processing elements that are roughly functionally equivalent to neurons of a biological brain. Neuromorphic systems may include various electronic circuits that model biological neurons.

BRIEF SUMMARY

Accordingly, one example aspect of the present invention is a neuromorphic memory circuit comprising a programmable resistive memory element, an axon leaky integrate and fire (LIF) pulse generator to generate an axon LIF pulse, a back propagation pulse generator to generate a back propagation pulse, a postsynaptic capacitor configured to build up a forward propagation LIF charge over time, and a presynaptic capacitor configured to build up a back propagation LIF charge over time. A first transistor, electrically coupled to the postsynaptic capacitor and the programmable resistive memory element, activates a first discharge path from the postsynaptic capacitor through the programmable resistive memory element when the axon LIF pulse generator generates the axon LIF pulse. A second transistor, electrically coupled to the presynaptic capacitor and the programmable resistive memory element, activates a second discharge path from the presynaptic capacitor through the programmable resistive memory element when the back propagation pulse generator generates the back propagation pulse.

Another example aspect of the present invention is a neuromorphic memory circuit comprising an axon leaky integrate and fire (LIF) pulse generator to generate an axon LIF pulse, a back propagation pulse generator to generate a back propagation pulse, a postsynaptic capacitor configured to build up a forward propagation LIF charge over time, and a presynaptic capacitor configured to build up a back propagation LIF charge over time. The neuromorphic memory circuit includes a memory cell array. Each memory cell in the memory cell array includes a programmable resistive memory element, a first transistor, and a second transistor. The first transistor is electrically coupled to the postsynaptic capacitor and the programmable resistive memory element, and activates a first discharge path from the postsynaptic capacitor through the programmable resistive memory element when the axon LIF pulse generator generates the axon LIF pulse. The second transistor is electrically coupled to the presynaptic capacitor and the programmable resistive memory element, and activates a second discharge path from the presynaptic capacitor through the programmable resistive memory element when the back propagation pulse generator generates the back propagation pulse.

Yet another example aspect of the present invention is a method for operating a neuromorphic memory circuit. The method includes accumulating a dendrite leaky integrate and fire (LIF) charge over time on a conductive dendrite LIF line and accumulating a back propagation LIF charge over time on a conductive axon back propagation line. A transmitting operation transmits an axon LIF pulse on a conductive axon LIF line. A switching operation switches on a first transistor in response to the axon LIF pulse such that the first transistor provides a first discharge path for the dendrite LIF charge through a programmable resistive memory element when the axon LIF line transmits the axon LIF pulse. A determining operation determines if a voltage at the dendrite LIF line falls below a first threshold voltage by a first comparator electrically coupled to the dendrite LIF line and the first threshold voltage. A generating operation generates a dendrite fire pulse if the voltage at the dendrite LIF line falls below the first threshold voltage. Another transmitting operation transmits a back propagation pulse on a conductive dendrite back propagation line. A switching operation switches on a second transistor in response to the back propagation pulse such that the second transistor provides a second discharge path for the back propagation LIF charge through the programmable resistive memory element when the dendrite back propagation line transmits the back propagation pulse. A determining operation determines if a voltage at the axon back propagation line falls below a second threshold voltage by a second comparator electrically coupled to the axon back propagation line and the second threshold voltage. A generating operation generates an axon fire pulse if the voltage at the axon back propagation line falls below the second threshold voltage.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
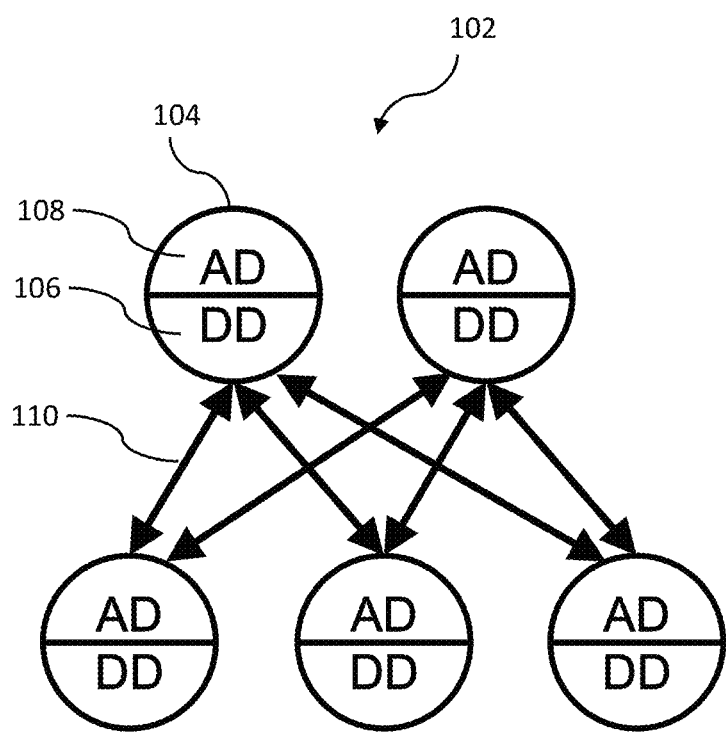
FIG. 1 shows a conceptual diagram of a bi-directional neural network according to one aspect of the present invention.

The present invention is described with reference to embodiments of the invention. Throughout the description of the invention reference is made to FIGS. 1-11C. When referring to the figures, like structures and elements shown throughout are indicated with like reference numerals.

A neuron behavior model may include a presynaptic neuron connected to a postsynaptic neuron via a synapse. The following variables can be defined:

$V_{pre}(t)$ is a membrane potential of presynaptic neuron (as a function of time).

$V_{post}(t)$ is a membrane potential of postsynaptic neuron (as a function of time).

w is a synaptic weight. Synaptic weight is the influence that a pre-synaptic firing will have on post-synaptic neuron. Synaptic weights are plastic or adaptive, and change through time. Synaptic weight exhibits two forms of plasticity: (a) long-term and (b) short-term. Long-term changes in the transmission properties of synapses provide a physiological substrate for learning and memory, whereas short-term changes support a variety of computations. The mechanism of short-term plasticity is a form of gain control.

$t_{pre}$ is a time when presynaptic neuron fires.

$t_{post}$ is a time when postsynaptic neuron fires.

Furthermore, the behavior model defines two functions: leaky integrate and fire (LIF) and spike timing dependent plasticity (STDP). LIF is a function that determines the $V_{post}$ of the cell body. When the presynaptic neuron fires, $\Delta V_{post}$ is proportional to w. STDP is a function that determines w. $\Delta w$ is a function of $\Delta t$ ($t_{post}-t_{pre}$). In other words, $\Delta w$ is a function of the timing difference between postsynaptic and presynaptic neuron firing. In STDP, synapses are only strengthened if the firing of their pre-synaptic neuron precede, and thus could have contributed to, the firing of the post synaptic neuron. Accidental, non-causal coincidences will weaken synapses.

U.S. patent application Ser. No. 14/596,223, filed Jan. 14, 2015, titled "NEUROMORPHIC MEMORY CIRCUIT", and incorporated by reference herein in its entirety, discloses a two transistor, one resistor (2T-1R) neuromorphic memory circuit structure. In this circuit, one transistor is used for LIF functionality and the other transistor is used for STDP functionality. As discussed in detail below, aspects of the present invention improve on this neuromorphic memory circuit structure by allowing backward transmission of information from the neuron circuit (postsynaptic neuron circuit) to the axon driver (presynaptic neuron circuit).

FIG. 1 shows a conceptual diagram of a bi-directional neural network 102 according to one aspect of the present invention. Each node 104 in the network 102 includes a dendrite driver (DD) 106 and an axon driver (AD) 108. In the 2T-1R neuromorphic memory circuit structure discussed above, an axon driver downstream in the network 102 (e.g., one of the lower three nodes) can cause an upstream axon driver (e.g., one of the upper two nodes) to fire. However, the 2T-1R neuromorphic memory circuit cannot pass information in the reverse direction.

By contrast, the neural network 102 of the present invention can implement bi-directional information flow 110. Specifically, an axon driver downstream in the network 102 can cause an upstream axon driver to fire and an upstream dendrite driver in the network 102 can cause a downstream dendrite driver to fire. This ability for backward transmission of information in artificial neural networks is called backpropagation and can be useful for training synaptic weights efficiently.

Figure 2:
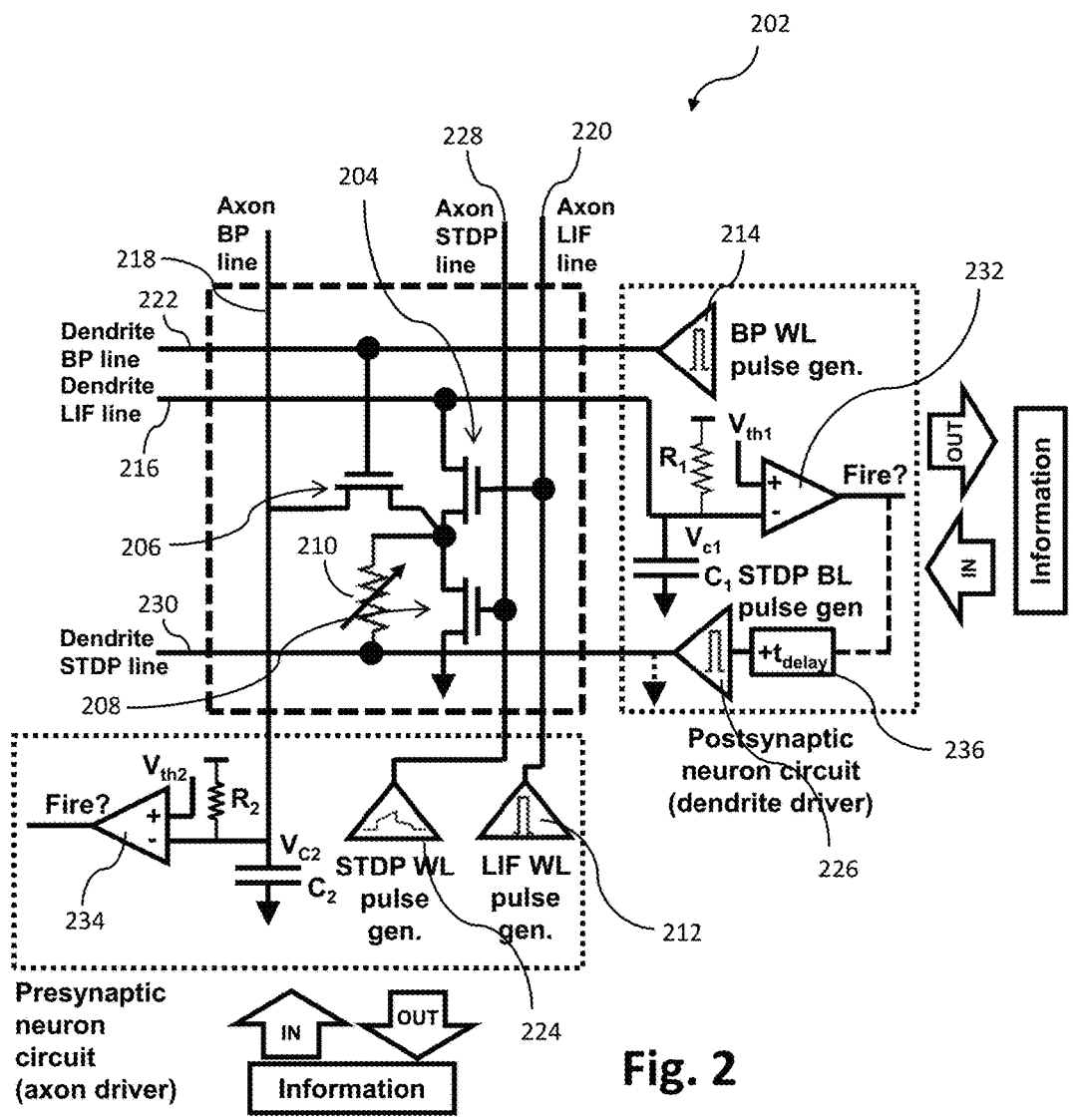
FIG. 2 shows a three transistor, one resistor (3T-1R) memory circuit contemplated by one embodiment of the present invention.

FIG. 2 shows a three transistor, one resistor (3T-1R) neuromorphic memory circuit 202 contemplated by one embodiment of the present invention. As discussed in detail below, the memory array structure contemplated by embodiments of the present invention separates forward LIF, back propagation LIF, and STDP functionality into three different circuit paths. In the 3T-1R circuit structure, a first transistor 204 is used for forward LIF functionality a second transistor 206 is used for back propagation LIF functionality, and a third transistor 208 is used for STDP functionality.

The neuromorphic memory circuit 202 includes a programmable resistive memory element 210. In one embodiment, the programmable resistive memory element 210 includes a phase change material. In phase change memory, information is generally stored in materials that can be manipulated into different phases. Each of these phases exhibit different electrical properties which can be used for storing information. The amorphous and crystalline phases are typically two phases used for bit storage (1's and 0's) since they have detectable differences in electrical resistance. Specifically, the amorphous phase (also referred to as the reset state) has a higher resistance than the crystalline phase (also referred to as the set state).

In a particular embodiment, the phase change material is composed of $Ge_xSb_yTe_z$, where a Ge atomic concentration x is within a range from 30% to 70%, a Sb atomic concentration y is within a range from 10% to 30%, and a Te atomic concentration z is within a range from 20% to 50%. U.S. patent application Ser. No. 14/596,223, filed Jan. 14, 2015, titled "PHASE CHANGE MEMORY WITH METASTABLE SET AND RESET STATES", and incorporated by reference herein in its entirety, discloses the electrical resistance of such phase change material programmed to the set state or the reset state drifts toward the initial electrical resistance over time that is useful in real-time self-learning applications.

In one embodiment, the phase change material has an electrical resistance and is programmable to a set state having a set electrical resistance and reset state having a reset electrical resistance at least a factor of 10 greater than the set electrical resistance. The phase change material may include an initial state with an initial electrical resistance between the set electrical resistance and the reset electrical resistance. Furthermore, the initial state is at a lower potential energy than the set state and the reset state such that the electrical resistance of the phase change material programmed to either the set state or the reset state drifts toward the initial electrical resistance over time. In other words, the set and reset states are metastable states, and the initial state is the ground state.

The neuromorphic memory circuit 202 includes an axon LIF pulse generator 212 and a back propagation pulse generator 214. The axon LIF pulse generator 212 is configured to generate an axon LIF pulse. The back propagation pulse generator 214 is configured to generate a back propagation pulse. In one embodiment, the pulse generators may be, for example, operational amplifiers or a transistors configured as emitter followers.

The neuromorphic memory circuit 202 includes a postsynaptic capacitor $C_1$ configured to build up a forward propagation LIF charge on a dendrite LIF line 216 over time. A first leak resistor $R_1$ coupled to a source voltage and the postsynaptic capacitor $C_1$ dictates the RC time constant for the change buildup at the dendrite LIF line 216. Similarly, a presynaptic capacitor $C_2$ is configured to build up a back propagation LIF charge on an axon back propagation line 218 over time. A second leak resistor $R_2$ coupled to the source voltage and the presynaptic capacitor $C_2$ dictates the RC time constant for the change buildup at the axon back propagation line 218.

The first transistor 204 is electrically coupled to the postsynaptic capacitor $C_1$ and the programmable resistive memory element 210. The first transistor 204 activates a first discharge path 302 (see FIGS. 3 and 4) from the postsynaptic capacitor $C_1$ through the programmable resistive memory element 210 when the axon LIF pulse generator 212 generates the axon LIF pulse. The dendrite LIF line 216 electrically couples the postsynaptic capacitor $C_1$ to the first transistor 204. An axon LIF line 220 transmits the axon LIF pulse from the axon LIF pulse generator 212 to the first transistor 204.

The second transistor 206 is electrically coupled to the presynaptic capacitor $C_2$ and the programmable resistive memory element 210. The second transistor 206 activates a second discharge path 502 (see FIGS. 5 and 6) from the presynaptic capacitor $C_2$ through the programmable resistive memory element 210 when the back propagation pulse generator 214 generates the back propagation pulse. The axon back propagation line 218 electrically couples the presynaptic capacitor $C_2$ to the second transistor 206. A dendrite back propagation line 222 transmits the back propagation pulse from the back propagation pulse generator 214 to the second transistor.

The neuromorphic memory circuit 202 includes an axon STDP pulse generator 224 configured to generate an axon STDP pulse. As discussed below, the axon STDP pulse is longer than the axon LIF pulse. A dendrite STDP pulse generator 226 is configured to generate a dendrite STDP pulse. In one mode of operation, the dendrite STDP pulse is triggered after the voltage $V_{C1}$ at the postsynaptic capacitor $C_1$ passes a first threshold voltage $V_{th1}$. In another mode of operation, the dendrite STDP pulse is triggered after the back propagation pulse generator 214 generates the back propagation pulse.

The third transistor 208 is electrically coupled to the axon STDP pulse generator 224 and the programmable resistive memory element 210. The third transistor 208 activates an electrical path 702 (see FIGS. 7 and 8) for the dendrite STDP pulse through the programmable resistive memory element 210 when the axon STDP pulse generator 224 generates the axon STDP pulse. An axon STDP line 228 is configured to transmit the axon STDP pulse to the third transistor 208. A dendrite STDP line 230 is configured to transmit the dendrite STDP pulse to the programmable resistive memory element.

In one embodiment, a postsynaptic comparator 232 compares the voltage $V_{C1}$ at the postsynaptic capacitor $C_1$ with the first threshold voltage $V_{th1}$ and indicate when the voltage $V_{C1}$ at the postsynaptic capacitor passes the first threshold voltage $V_{th1}$. A delay unit 236 is configured to delay transmission of the indication that the voltage $V_{C1}$ at the postsynaptic capacitor $C_1$ passed the first threshold voltage $V_{th1}$ to the dendrite STDP pulse generator 226.

A presynaptic comparator 234 compares a voltage $V_{C2}$ at the presynaptic capacitor $C_2$ with a second threshold voltage $V_{th2}$ and indicate when the voltage $V_{C2}$ at the presynaptic capacitor $C_2$ passes the second threshold voltage $V_{th2}$. In one embodiment, the presynaptic comparator 234 causes the axon STDP pulse generator 224 to transmit the axon STDP pulse to the third transistor 208 when the voltage $V_{C2}$ at the presynaptic capacitor $C_2$ falls below the second threshold voltage $V_{th2}$ during the back propagation pulse.

Figure 3:
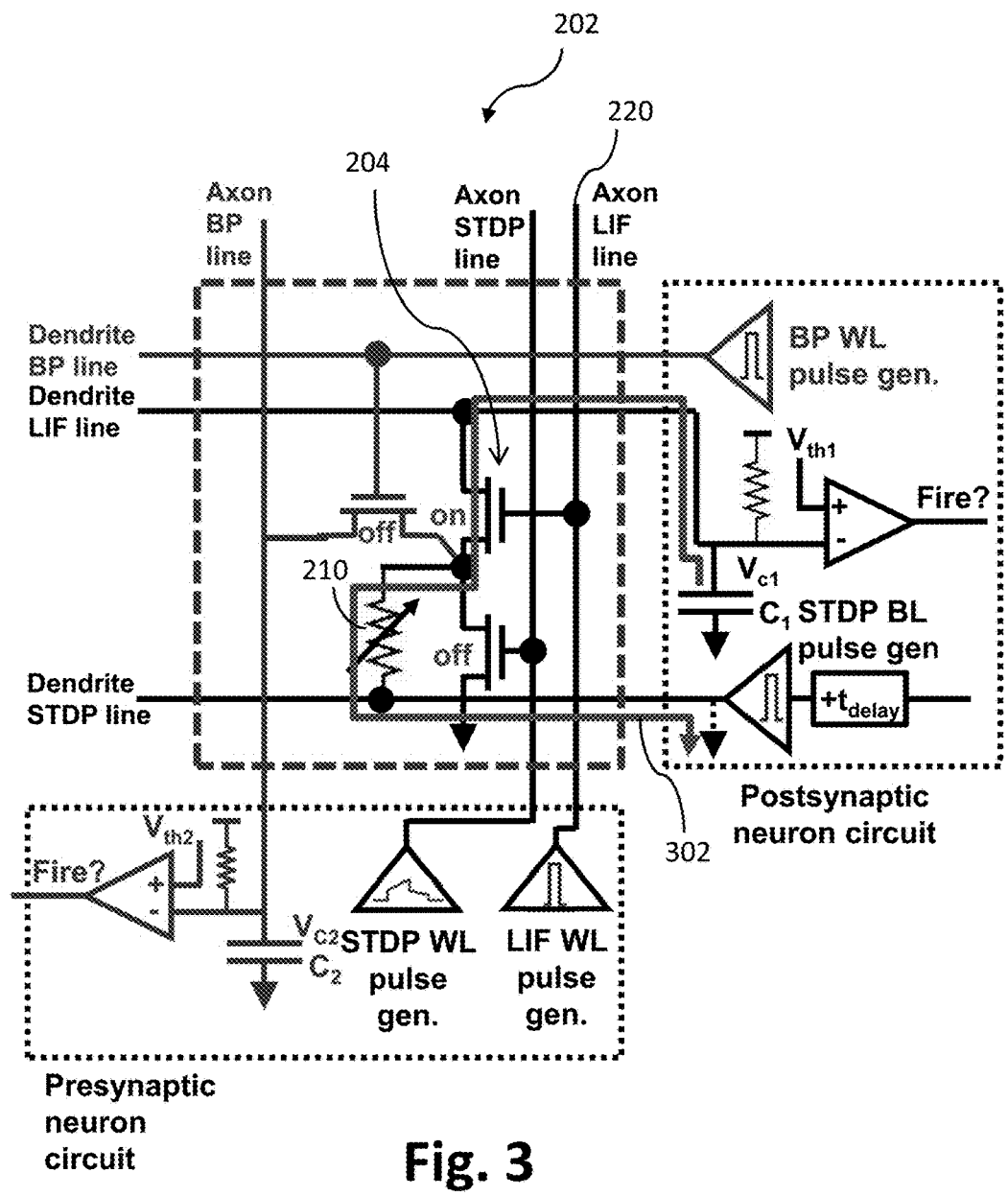
FIG. 3 shows a first transistor activated (switched on) to provide a discharge path for a postsynaptic capacitor through a programmable resistive memory element to ground when an axon LIF line transmits an axon LIF pulse.

FIG. 3 shows the first transistor 204 activated (switched on) to provide a discharge path 302 for the postsynaptic capacitor $C_1$ through the programmable resistive memory element 210 to ground when the axon LIF line 220 transmits the axon LIF pulse.

Figure 4:
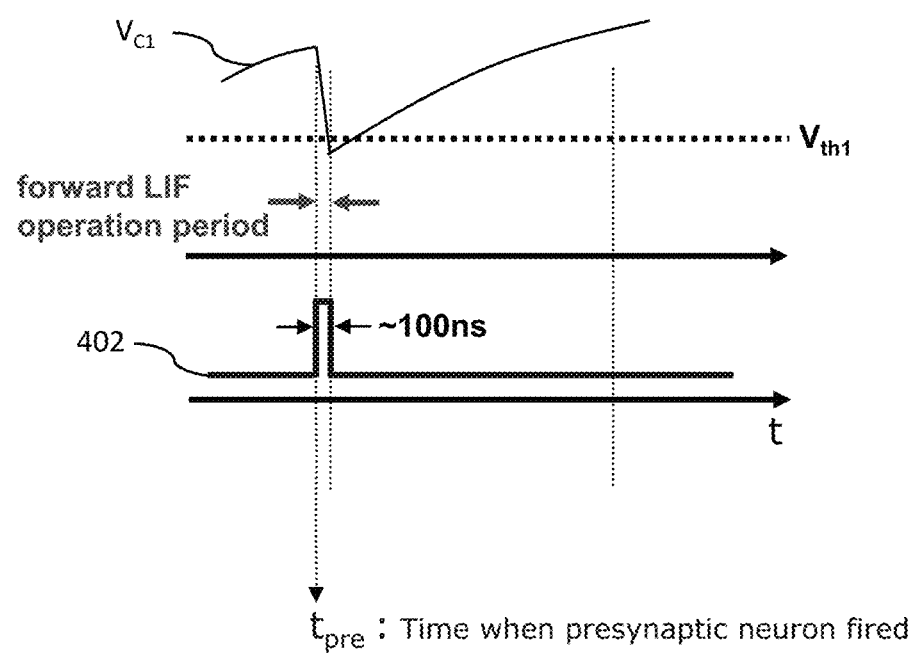
FIG. 4 shows an example of the voltage at the postsynaptic capacitor dropping below the first threshold voltage during transmission of an axon LIF pulse.

FIG. 4 shows an example of the voltage $V_{C1}$ at the postsynaptic capacitor $C_1$ dropping below the first threshold voltage $V_{th1}$ during transmission of an axon LIF pulse 402. As discussed in more detail below, this causes the postsynaptic comparator 232 to fire.

Figure 5:
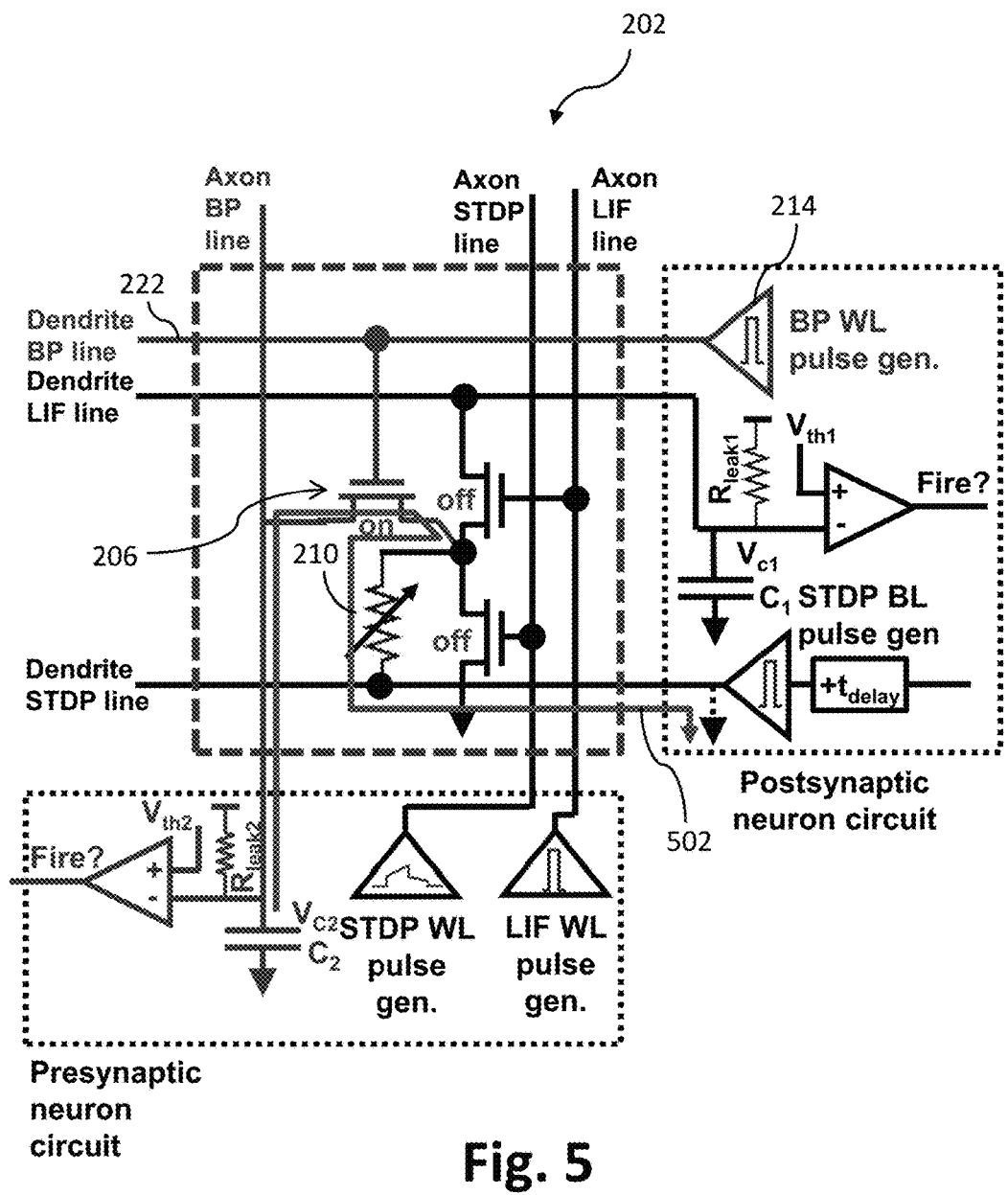
FIG. 5 shows a second transistor activated (switched on) to provide a discharge path for a presynaptic capacitor through the programmable resistive memory element to ground when a dendrite back propagation line transmits a back propagation pulse.

FIG. 5 shows the second transistor 206 activated (switched on) to provide a discharge path 502 for the presynaptic capacitor $C_2$ through the programmable resistive memory element 210 to ground when the dendrite back propagation line 222 transmits the back propagation pulse.

Figure 6:
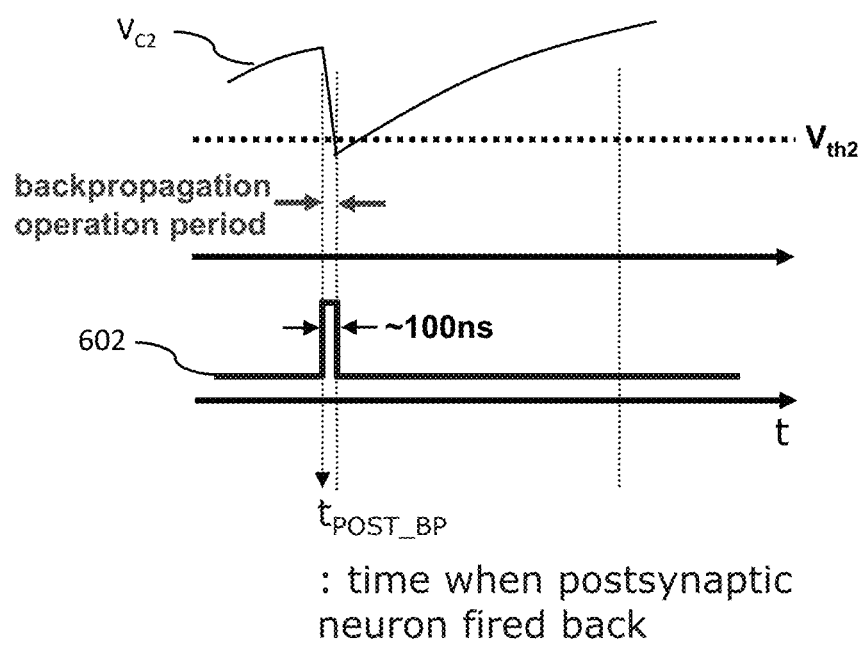
FIG. 6 shows an example of a voltage at a presynaptic capacitor dropping below a second threshold voltage during transmission of a back propagation pulse.

FIG. 6 shows an example of the voltage $V_{C2}$ at the presynaptic capacitor $C_2$ dropping below the second threshold voltage $V_{th2}$ during transmission of a back propagation pulse 602. In this figure, the voltage $V_{C2}$ at the presynaptic capacitor $C_2$ is shown falling below the second threshold voltage $V_{th2}$ during the back propagation pulse 602. This causes the presynaptic comparator 234 to fire. In one embodiment, the presynaptic comparator 234 causes the axon STDP pulse generator 224 to transmit the axon STDP pulse to the third transistor 208 when the voltage $V_{C2}$ at the presynaptic capacitor $C_2$ falls below the second threshold voltage $V_{th2}$ during the back propagation pulse 602.

Figure 7:
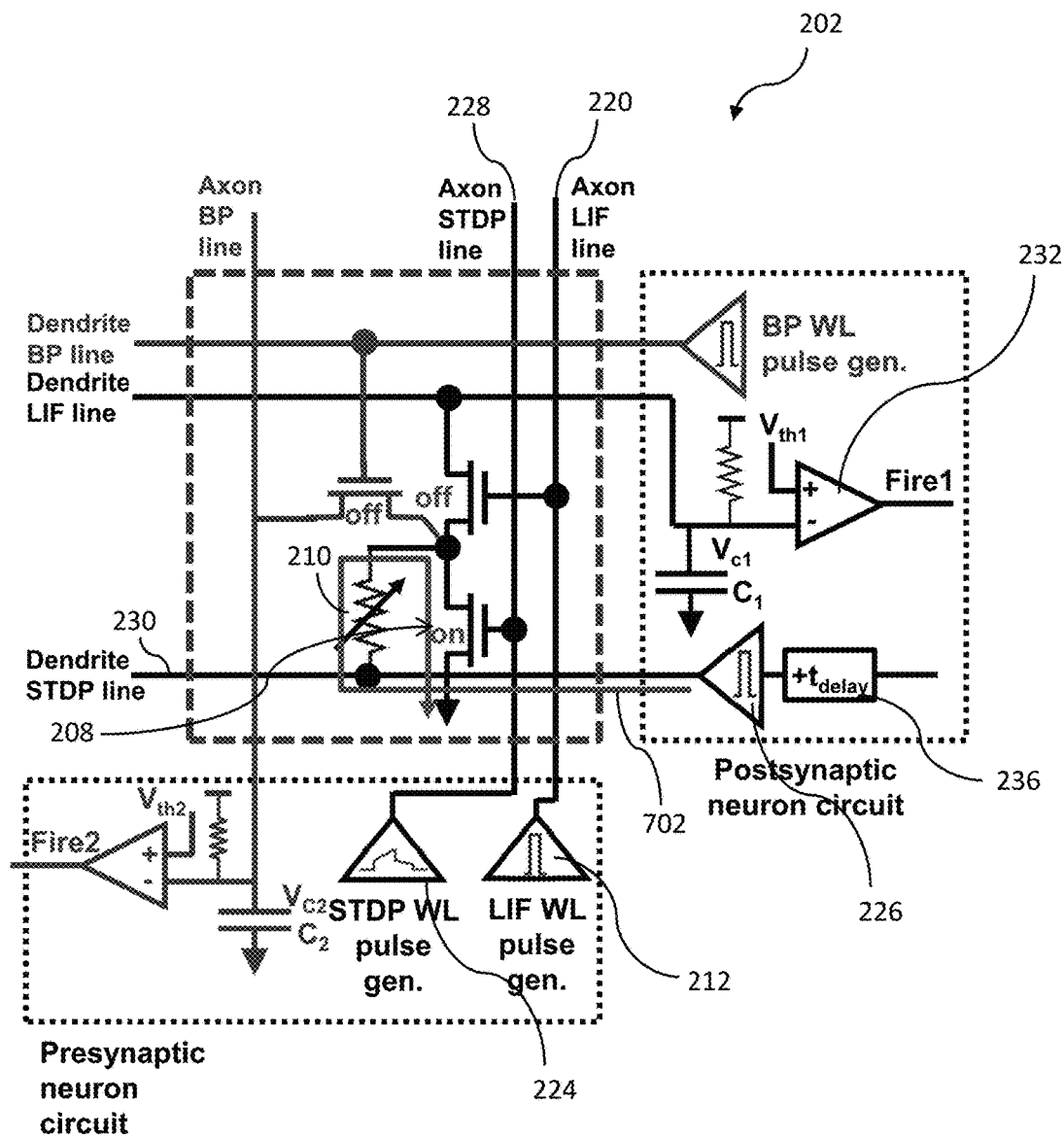
FIG. 7 shows a third transistor activated (switched on) to provide an electrical path for a dendrite STDP pulse through the programmable resistive memory element when an axon STDP pulse generator generates an axon STDP pulse.

FIG. 7 shows the third transistor 208 activated (switched on) to provide an electrical path 702 for the dendrite STDP pulse through the programmable resistive memory element 210 when the axon STDP pulse generator 224 generates the axon STDP pulse.

Figure 8:
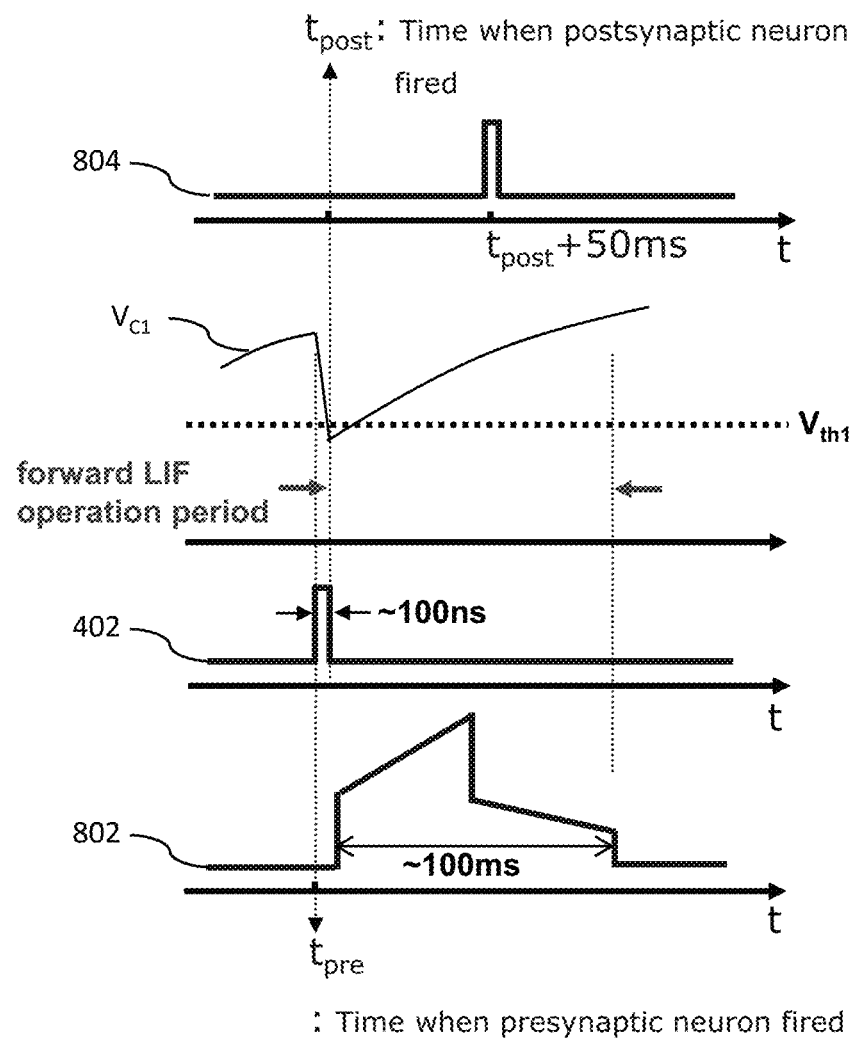
FIG. 8 shows an example of an axon LIF pulse, followed by an axon STDP pulse, then followed by a dendrite STDP pulse after the voltage at a postsynaptic capacitor passes a first threshold voltage.

FIG. 8 shows an example of an axon LIF pulse 402, followed by an axon STDP pulse 802, then followed by a dendrite STDP pulse 804 after the voltage $V_{C1}$ at the postsynaptic capacitor $C_1$ passes a first threshold voltage $V_{th1}$. Since the postsynaptic capacitor $C_1$ passes a first threshold voltage $V_{th1}$ at time $t_{post}$, the postsynaptic comparator 232 fires. However, the delay unit 236 delays transmission of the indication that the voltage $V_{C1}$ at the postsynaptic capacitor $C_1$ passed the first threshold voltage $V_{th1}$ to the dendrite STDP pulse generator 226. Thus, the dendrite STDP pulse 804 is generated at time $t_{post}$+delay (50 ms). In another mode of operation, the dendrite STDP pulse 804 is triggered after the back propagation pulse generator generates the back propagation pulse.

As mentioned above, the axon STDP pulse 802 is longer than the axon LIF pulse 402. In a particular embodiment, the axon LIF pulse 402 is approximately 100 ns and the axon STDP pulse 802 is approximately 100 ms. It is noted that pulse timings shown in FIG. 8 are for illustration purposes only and may be adjusted without departing from the scope of the present invention.

As shown, the axon STDP pulse magnitude significantly decreases approximately half way through the pulse. Thus, if $\Delta t$ $(t_{post}-t_{pre})>0$, the dendrite STDP pulse 804 is transmitted during the lower magnitude portion of the axon STDP pulse 802 and the phase change material is programmed toward the lower-resistance, set state. If $\Delta t$ $(t_{post}-t_{pre})<0$, the dendrite STDP pulse 804 is transmitted during the higher magnitude portion of the axon STDP pulse 802 and the phase change material is programmed toward the higher-resistance, reset state. In this manner, the memory element simulates synapses that are strengthened if the firing of their presynaptic neuron precede the firing of the postsynaptic neuron, and weakened if the firing of their presynaptic neuron follow the firing of the postsynaptic neuron.

Figure 9:
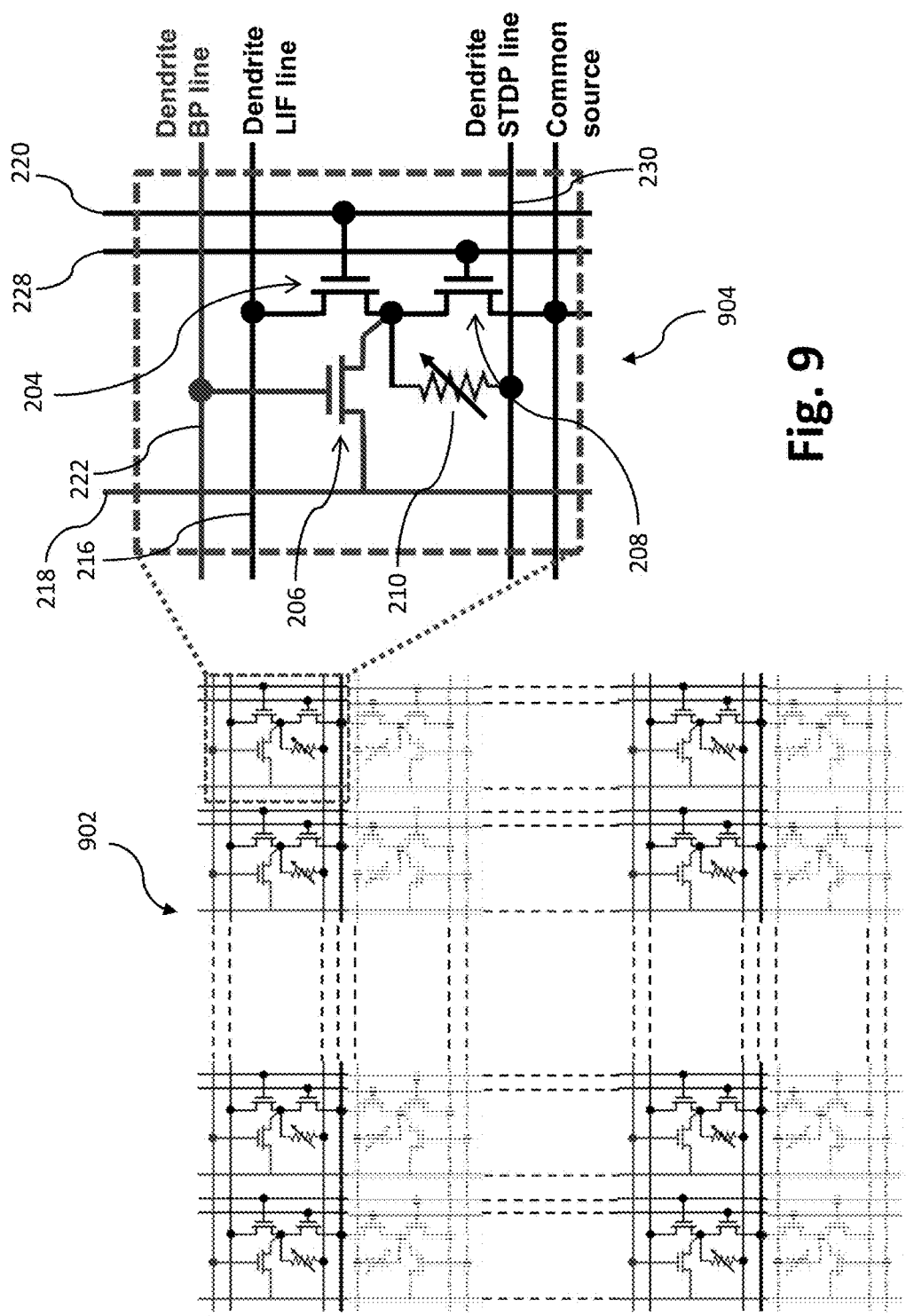
FIG. 9 shows another embodiment of the neuromorphic memory circuit contemplated by the present invention.

FIG. 9 shows another embodiment of the neuromorphic memory circuit contemplated by the present invention. The neuromorphic memory circuit includes a memory cell array 902. Each memory cell 904 in the memory cell array 902 includes a programmable resistive memory element 210, a first transistor 204, second transistor 206 and third transistor 208.

As discussed above, the first transistor 204 is electrically coupled to a postsynaptic capacitor and the programmable resistive memory element. The first transistor activates a first discharge path from the postsynaptic capacitor through the programmable resistive memory element 210 when an axon LIF pulse generator generates an axon LIF pulse.

The second transistor 206 is electrically coupled to a presynaptic capacitor and the programmable resistive memory element 210. The second transistor 206 activates a second discharge path from the presynaptic capacitor through the programmable resistive memory element 210 when a back propagation pulse generator generates a back propagation pulse.

The third transistor 208 is electrically coupled to an axon STDP pulse generator and the programmable resistive memory element 210. The third transistor 208 activates an electrical path for a dendrite STDP pulse through the programmable resistive memory element 210 when the axon STDP pulse generator generates an axon STDP pulse.

The memory cell array 902 includes an axon LIF line 220 to transmit the axon LIF pulse from the axon LIF pulse generator to the first transistor 204. A dendrite LIF line 216 electrically couples the postsynaptic capacitor to the first transistor 216. An axon back propagation line 218 electrically couples the presynaptic capacitor to the second transistor 206. A dendrite back propagation line 222 transmits the back propagation pulse from the back propagation pulse generator to the second transistor 206. An axon STDP line 228 transmits the axon STDP pulse to the third transistor 208. A dendrite STDP line 230 transmits the dendrite STDP pulse to the programmable resistive memory element 210.

Figure 10:
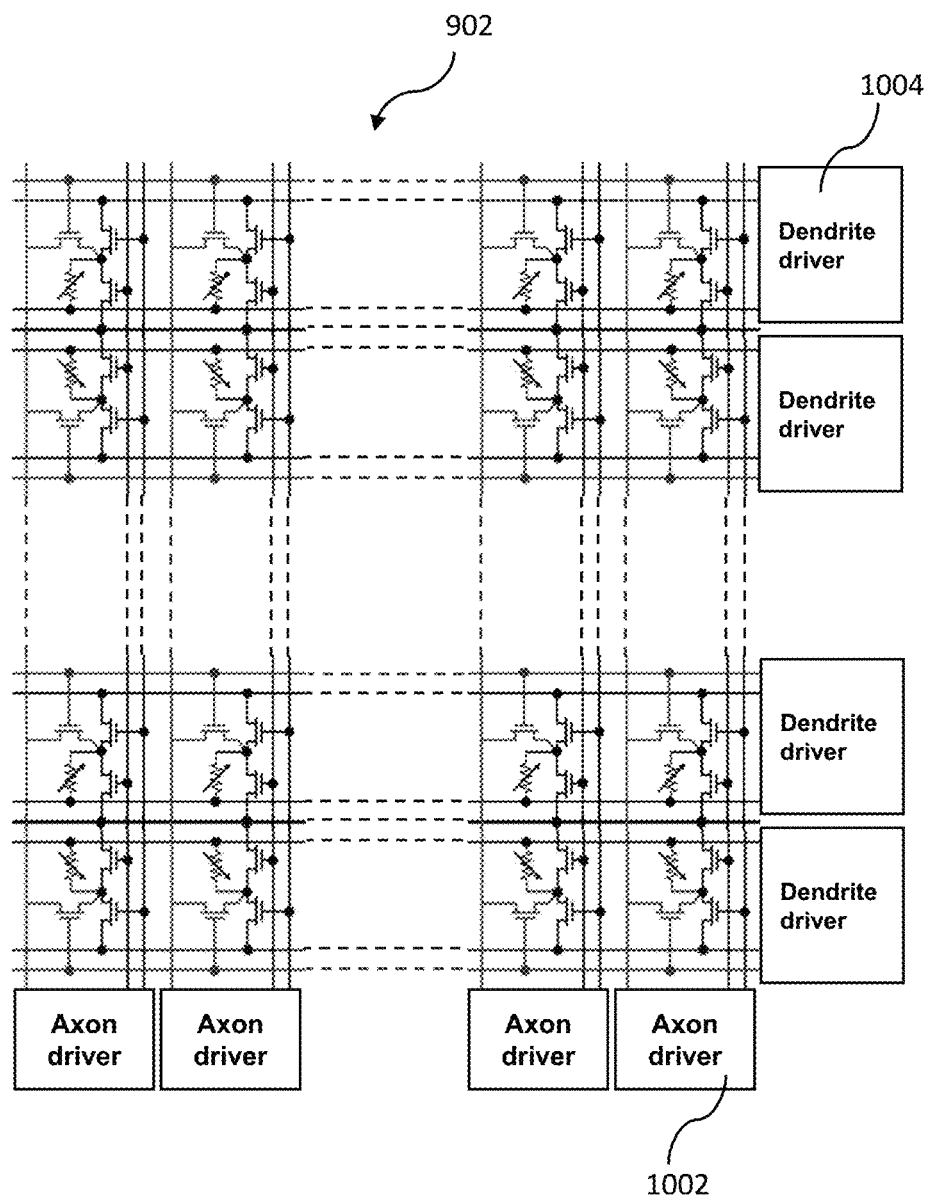
FIG. 10 shows peripheral circuitry around a memory cell array, as contemplated by one embodiment of the present invention.

FIG. 10 shows peripheral circuitry around the memory cell array 902, as contemplated by one embodiment of the present invention. An axon driver 1002 includes an axon LIF pulse generator to generate an axon LIF pulse, an axon STDP pulse generator to generate an axon STDP pulse, a presynaptic capacitor configured to build up a back propagation LIF charge over time, a second leak resistor coupled to the source voltage and the presynaptic capacitor, and a presynaptic comparator to compare a voltage at the presynaptic capacitor with a second threshold voltage and indicate when the voltage at the presynaptic capacitor passes the second threshold voltage. These components are described in detail above.

A dendrite driver 1004 includes a back propagation pulse generator to generate a back propagation pulse, a dendrite STDP pulse generator to generate a dendrite STDP pulse after a voltage at the postsynaptic capacitor passes a first threshold voltage, a postsynaptic capacitor configured to build up a forward propagation LIF charge over time, a first leak resistor coupled to a source voltage and the postsynaptic capacitor, a postsynaptic comparator to compare the voltage at the postsynaptic capacitor with the first threshold voltage and indicate when the voltage at the postsynaptic capacitor passes the first threshold voltage, and a delay unit to delay transmission of the indication that the voltage at the postsynaptic capacitor passed the first threshold voltage to the dendrite STDP pulse generator. These components are described in detail above.

Figure 11A:
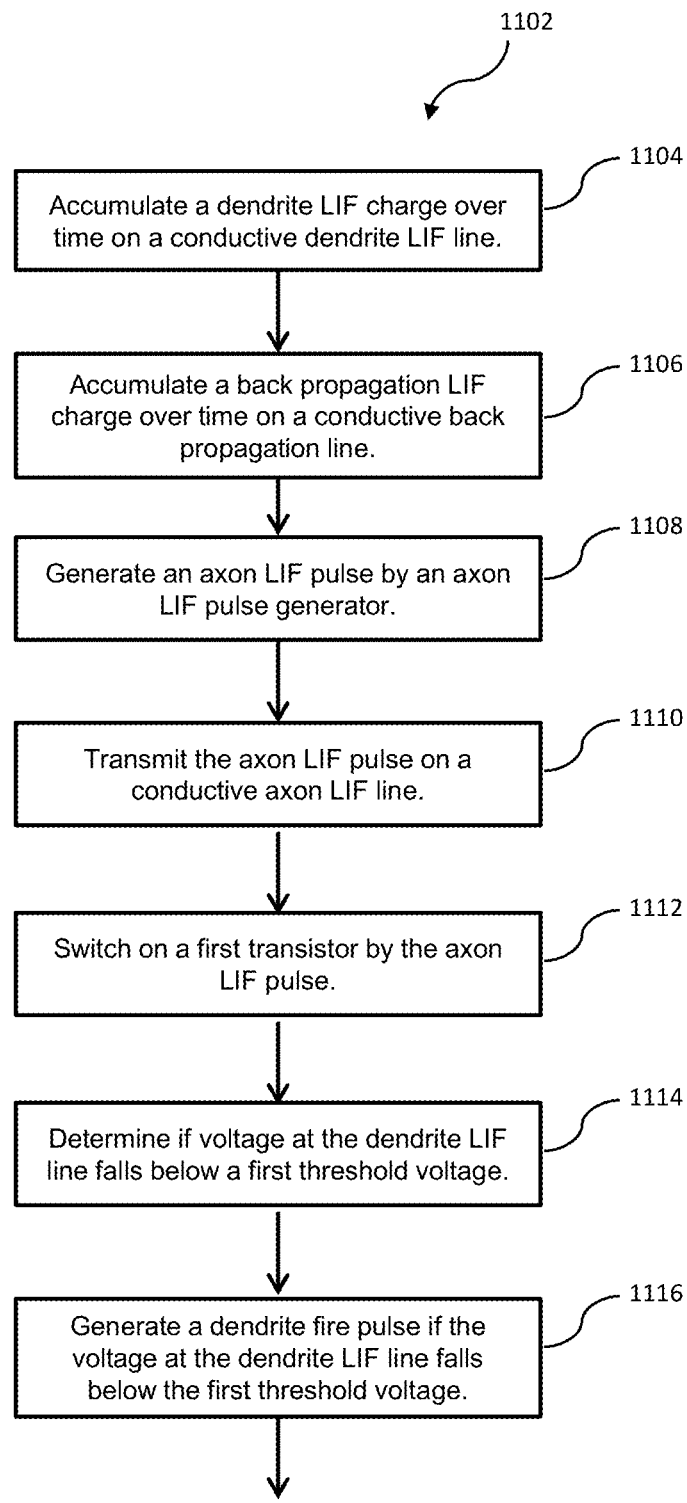
FIGS. 11A-11C show an example method for operating a neuromorphic memory circuit contemplated by the present invention.
Figure 11B:
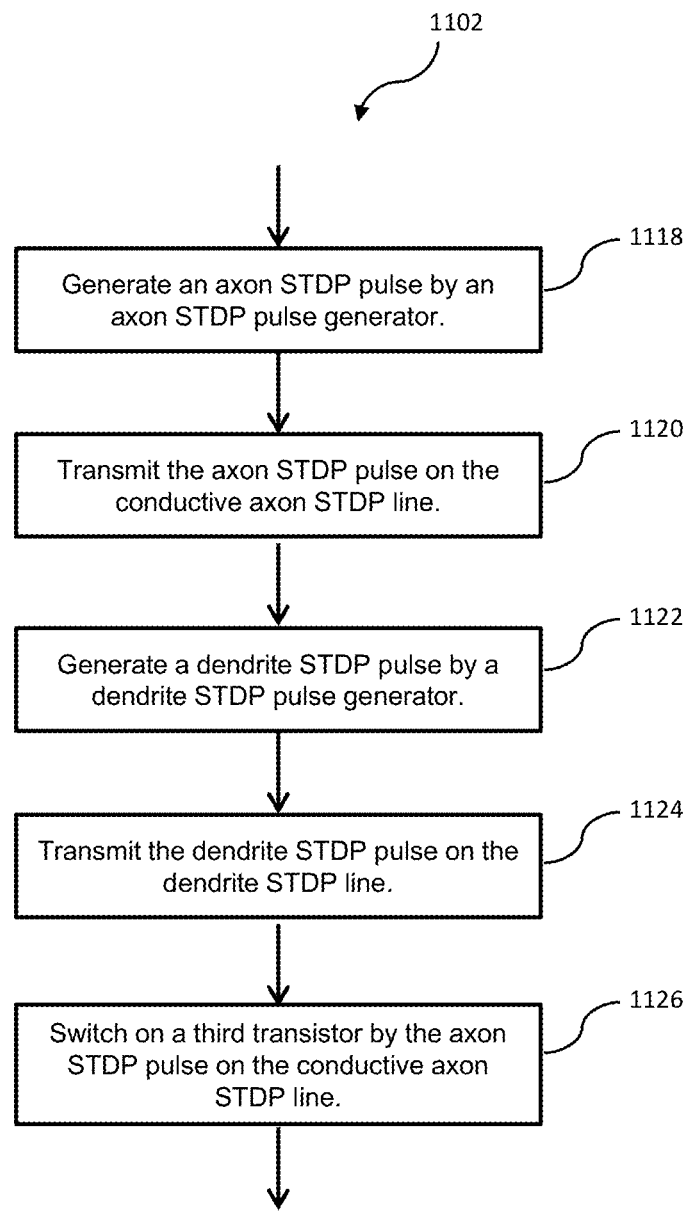
Figure 11C:
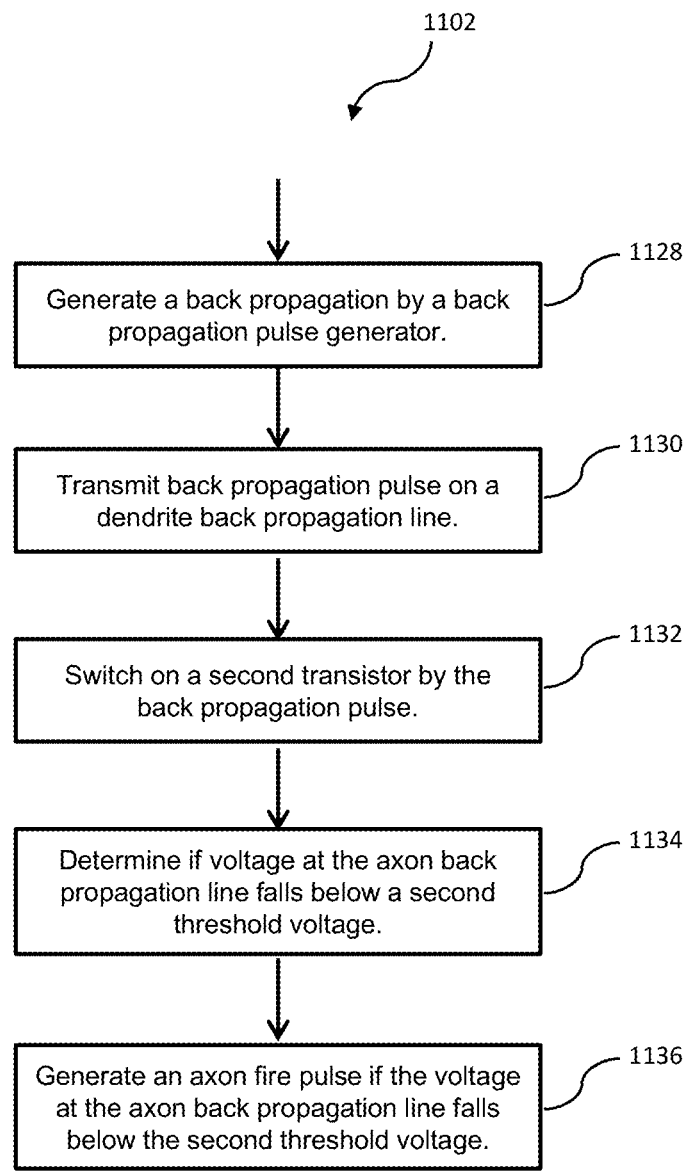

FIGS. 11A and 11B show an example method 1102 for operating a neuromorphic memory circuit contemplated by the present invention. The method steps are shown in chronological order for illustration purposes only. Operations may execute concurrently and/or in a different order than illustrated without departing from the spirit and scope of the present invention.

The method 1102 includes an accumulating operation 1104 for accumulating a dendrite LIF charge over time on a conductive dendrite LIF line. In one embodiment, accumulating operation 1104 is achieved with a first leak resistor and a postsynaptic integration capacitor electrically coupled to the dendrite LIF line. The first leak resistor and postsynaptic integration capacitor buildup charge on the conductive dendrite LIF line at an RC time constant. The conductive dendrite LIF line may be electrically coupled to a row of memory cells. Accumulating operation 1104 is followed by accumulating operation 1106.

At accumulating operation 1106, a back propagation LIF charge is accumulated over time on an axon back propagation line. In one embodiment, accumulating operation 1106 is achieved with a second leak resistor and a presynaptic integration capacitor electrically coupled to the axon back propagation line. The second leak resistor and presynaptic integration capacitor buildup charge on the axon back propagation line at an RC time constant. The axon back propagation line may be electrically coupled to a column of memory cells. Accumulating operation 1106 is followed by generating operation 1108.

At generating operation 1108, an axon LIF pulse is generated by an axon LIF pulse generator electrically coupled to the axon LIF line. In a particular embodiment, the axon LIF pulse is approximately 100 ns long. Generating operation 1108 is followed by transmitting operation 1110.

At transmitting operation 1110, the axon LIF pulse is transmitted on a conductive axon LIF line. In one embodiment of the invention, the conductive axon LIF line is electrically coupled to a column of memory cells. Transmitting operation 1110 is followed by switching operation 1112.

At switching operation 1112, a first transistor is switched on by the axon LIF pulse such that the first transistor provides a first discharge path for the dendrite LIF charge through a programmable resistive memory element when the axon LIF line transmits the axon LIF pulse. In a particular embodiment of the invention, the programmable resistive memory element is a phase change memory element. Switching operation 1112 is followed by determining operation 1114.

At determining operation 1114, voltage at the dendrite LIF line is compared to a first threshold voltage. In one embodiment, a first comparator is electrically coupled to the conductive dendrite LIF line and the first threshold voltage and determines if voltage at the dendrite LIF line falls below the first threshold voltage. Determining operation 1114 is followed by generating operation 1116.

At generating operation 1116, a dendrite fire pulse is generated if voltage at the dendrite LIF line falls below the first threshold voltage. Generating operation 1116 is followed by generating operation 1118.

At generating operation 1118, an axon STDP pulse is generated by an axon STDP pulse generator. The axon STDP pulse generator is electrically coupled to a conductive axon STDP line. In one embodiment of the invention, the conductive axon STDP line is electrically coupled to the column of memory cells. Generating operation 1118 is followed by transmitting operation 1120.

At transmitting operation 1120, the axon STDP pulse is transmitted on the conductive axon STDP line. In one embodiment of the invention, the conductive axon STDP line is electrically coupled to the column of memory cells. Transmitting operation 1120 is followed by generating operation 1122.

At generating operation 1122, a dendrite STDP pulse is generated by a dendrite STDP pulse generator. The dendrite STDP pulse is triggered by the dendrite fire pulse. Thus, the dendrite STDP pulse is generated when the voltage at the dendrite LIF line falls below the first threshold voltage. As discussed above, a delay unit delays transmission of the dendrite fire pulse to the dendrite STDP pulse generator by an amount of time. In one embodiment, the delay time is half the pulse width of the axon STDP pulse. The dendrite STDP pulse generator is electrically coupled to a dendrite STDP line. Generating operation 1122 is followed by transmitting operation 1124.

At transmitting operation 1124, the dendrite STDP pulse is transmitted on the dendrite STDP line. In one embodiment, the dendrite STDP line is electrically coupled to a row of memory cells. Transmitting operation 1124 is followed by switching operation 1126.

At switching operation 1126, a third transistor is switched on in response to the axon STDP pulse. The third transistor provides an electrical path for the dendrite STDP pulse through the programmable resistive memory element when the axon STDP line transmits the axon STDP pulse. The switching operation 1126 is followed by generating operation 1128.

At generating operation 1128, a back propagation pulse is generated by a back propagation pulse generator electrically coupled to dendrite back propagation line. In a particular embodiment, the back propagation pulse is approximately 100 ns long. Generating operation 1128 is followed by transmitting operation 1130.

At transmitting operation 1130, the back propagation pulse is transmitted on a conductive dendrite back propagation line. In one embodiment of the invention, the dendrite back propagation line is electrically coupled to a row of memory cells. Transmitting operation 1130 is followed by switching operation 1132.

At switching operation 1132, a second transistor is switched on by the back propagation pulse such that the second transistor provides a second discharge path for the back propagation LIF charge through the programmable resistive memory element when the dendrite back propagation line transmits the back propagation pulse. Switching operation 1132 is followed by determining operation 1134.

At determining operation 1134, voltage at the axon back propagation line is compared to a second threshold voltage. In one embodiment, a second comparator is electrically coupled to the axon back propagation line and the second threshold voltage. The second comparator determines if voltage at the axon back propagation line falls below the second threshold voltage. Determining operation 1134 is followed by generating operation 1136.

At generating operation 1136, an axon fire pulse is generated if voltage at the axon back propagation line falls below the second threshold voltage.

Accordingly, embodiments of the present invention can transmit information in both forward and backward directions. This backward transmission of information in artificial neural networks is called back propagation and can be useful for training synaptic weights efficiently. As discussed above, back propagation is implemented by the same leaky integrate and fire (LIF) mechanism as the forward information propagation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A neuromorphic memory circuit comprising:
a programmable resistive memory element;
an axon leaky integrate and fire (LIF) pulse generator to generate an axon LIF pulse;
a back propagation pulse generator to generate a back propagation pulse;
a postsynaptic capacitor configured to build up a forward propagation LIF charge over time;
a presynaptic capacitor configured to build up a back propagation LIF charge over time;
a first transistor electrically coupled to the postsynaptic capacitor and the programmable resistive memory element, the first transistor activating a first discharge path from the postsynaptic capacitor through the programmable resistive memory element when the axon LIF pulse generator generates the axon LIF pulse; and
a second transistor electrically coupled to the presynaptic capacitor and the programmable resistive memory element, the second transistor activating a second discharge path from the presynaptic capacitor through the programmable resistive memory element when the back propagation pulse generator generates the back propagation pulse.

2. The neuromorphic memory circuit of claim 1, further comprising:
   an axon LIF line to transmit the axon LIF pulse from the axon LIF pulse generator to the first transistor;
   a dendrite LIF line electrically coupling the postsynaptic capacitor to the first transistor;
   an axon back propagation line electrically coupling the presynaptic capacitor to the second transistor; and
   a dendrite back propagation line to transmit the back propagation pulse from the back propagation pulse generator to the second transistor.

3. The neuromorphic memory circuit of claim 1, further comprising:
   an axon spike timing dependent plasticity (STDP) pulse generator to generate an axon STDP pulse, the axon STDP pulse being longer than the axon LIF pulse;
   a dendrite STDP pulse generator to generate a dendrite STDP pulse after a voltage at the postsynaptic capacitor passes a first threshold voltage; and
   a third transistor electrically coupled to the axon STDP pulse generator and the programmable resistive memory element, the third transistor activating an electrical path for the dendrite STDP pulse through the programmable resistive memory element when the axon STDP pulse generator generates the axon STDP pulse.

4. The neuromorphic memory circuit of claim 3, further comprising:
   a postsynaptic comparator to compare the voltage at the postsynaptic capacitor with the first threshold voltage and indicate when the voltage at the postsynaptic capacitor passes the first threshold voltage; and
   a presynaptic comparator to compare a voltage at the presynaptic capacitor with a second threshold voltage and indicate when the voltage at the presynaptic capacitor passes the second threshold voltage.

5. The neuromorphic memory circuit of claim 4, further comprising a delay unit to delay transmission of the indication that the voltage at the postsynaptic capacitor passed the first threshold voltage to the dendrite STDP pulse generator.

6. The neuromorphic memory circuit of claim 3, further comprising:
   an axon STDP line to transmit the axon STDP pulse to the third transistor; and
   a dendrite STDP line to transmit the dendrite STDP pulse to the programmable resistive memory element.

7. The neuromorphic memory circuit of claim 1, further comprising:
   a first leak resistor coupled to a source voltage and the postsynaptic capacitor; and
   a second leak resistor coupled to the source voltage and the presynaptic capacitor.

8. The neuromorphic memory circuit of claim 1, wherein the programmable resistive memory element includes a phase change material.

9. The neuromorphic memory circuit of claim 8, wherein the phase change material has an electrical resistance and is programmable to a set state having a set electrical resistance and reset state having a reset electrical resistance at least a factor of 10 greater than the set electrical resistance, the phase change material includes an initial state having an initial electrical resistance between the set electrical resistance and the reset electrical resistance, the initial state is at a lower potential energy than the set state and the reset state such that the electrical resistance of the phase change material programmed to the set state or the reset state drifts toward the initial electrical resistance over time.

10. The neuromorphic memory circuit of claim 9, wherein the phase change material includes $Ge_xSb_yTe_z$, where a Ge atomic concentration x is within a range from 30% to 70%, a Sb atomic concentration y is within a range from 10% to 30%, and a Te atomic concentration z is within a range from 20% to 50%.

11. A neuromorphic memory circuit comprising:
   an axon leaky integrate and fire (LIF) pulse generator to generate an axon LIF pulse;
   a back propagation pulse generator to generate a back propagation pulse;
   a postsynaptic capacitor configured to build up a forward propagation LIF charge over time;
   a presynaptic capacitor configured to build up a back propagation LIF charge over time; and
   a memory cell array, each memory cell in the memory cell array including:
      a programmable resistive memory element;
      a first transistor electrically coupled to the postsynaptic capacitor and the programmable resistive memory element, the first transistor activating a first discharge path from the postsynaptic capacitor through the programmable resistive memory element when the axon LIF pulse generator generates the axon LIF pulse; and
      a second transistor electrically coupled to the presynaptic capacitor and the programmable resistive memory element, the second transistor activating a second discharge path from the presynaptic capacitor through the programmable resistive memory element when the back propagation pulse generator generates the back propagation pulse.

12. The neuromorphic memory circuit of claim 11, further comprising:
   an axon LIF line to transmit the axon LIF pulse from the axon LIF pulse generator to the first transistor;
   a dendrite LIF line electrically coupling the postsynaptic capacitor to the first transistor;
   an axon back propagation line electrically coupling the presynaptic capacitor to the second transistor; and
   a dendrite back propagation line to transmit the back propagation pulse from the back propagation pulse generator to the second transistor.

13. The neuromorphic memory circuit of claim 11, further comprising:
   an axon spike timing dependent plasticity (STDP) pulse generator to generate an axon STDP pulse, the axon STDP pulse being longer than the axon LIF pulse;
   a dendrite STDP pulse generator to generate a dendrite STDP pulse after a voltage at the postsynaptic capacitor passes a first threshold voltage; and
   wherein each memory cell in the memory cell array further includes a third transistor electrically coupled to the axon STDP pulse generator and the programmable resistive memory element, the third transistor activating an electrical path for the dendrite STDP pulse through the programmable resistive memory element when the axon STDP pulse generator generates the axon STDP pulse.

14. The neuromorphic memory circuit of claim 13, further comprising:
   a postsynaptic comparator to compare the voltage at the postsynaptic capacitor with the first threshold voltage and indicate when the voltage at the postsynaptic capacitor passes the first threshold voltage; and a presynaptic comparator to compare a voltage at the presynaptic capacitor with a second threshold voltage and indicate when the voltage at the presynaptic capacitor passes the second threshold voltage.

15. The neuromorphic memory circuit of claim 14, further comprising a delay unit to delay transmission of the indication that the voltage at the postsynaptic capacitor passed the first threshold voltage to the dendrite STDP pulse generator.

16. The neuromorphic memory circuit of claim 13, further comprising:
   an axon STDP line to transmit the axon STDP pulse to the third transistor; and
   a dendrite STDP line to transmit the dendrite STDP pulse to the programmable resistive memory element.

17. A method for operating a neuromorphic memory circuit, the method comprising:
   accumulating a dendrite leaky integrate and fire (LIF) charge over time on a conductive dendrite LIF line;
   accumulating a back propagation LIF charge over time on a conductive axon back propagation line;
   transmitting an axon LIF pulse on a conductive axon LIF line;
   switching on a first transistor in response to the axon LIF pulse such that the first transistor provides a first discharge path for the dendrite LIF charge through a programmable resistive memory element when the axon LIF line transmits the axon LIF pulse;
   determining if a voltage at the dendrite LIF line falls below a first threshold voltage by a first comparator electrically coupled to the dendrite LIF line and the first threshold voltage;
   generating a dendrite fire pulse if the voltage at the dendrite LIF line falls below the first threshold voltage;
   transmitting a back propagation pulse on a conductive dendrite back propagation line;
   switching on a second transistor in response to the back propagation pulse such that the second transistor provides a second discharge path for the back propagation LIF charge through the programmable resistive memory element when the dendrite back propagation line transmits the back propagation pulse;
   determining if a voltage at the axon back propagation line falls below a second threshold voltage by a second comparator electrically coupled to the axon back propagation line and the second threshold voltage; and
   generating an axon fire pulse if the voltage at the axon back propagation line falls below the second threshold voltage.

18. The method of claim 17, further comprising:
   generating the axon LIF pulse by an axon LIF pulse generator electrically coupled to the axon LIF line;
   generating the back propagation pulse by a back propagation pulse generator electrically coupled to dendrite back propagation line.

19. The method of claim 17, further comprising:
   transmitting an axon spike timing dependent plasticity (STDP) pulse on a conductive axon STDP line;
   transmitting a dendrite STDP pulse after the voltage at the dendrite LIF line falls below the first threshold voltage;
   switching on a third transistor in response to the axon STDP pulse, the third transistor providing an electrical path for the dendrite STDP pulse through the programmable resistive memory element when the axon STDP line transmits the axon STDP pulse.

20. The method of claim 19, further comprising:
   generating the axon STDP pulse by an axon STDP pulse generator electrically coupled to the conductive axon STDP line; and
   generating the dendrite STDP pulse by a dendrite STDP pulse generator electrically coupled to the dendrite STDP line.

* * * * *